United States Patent
Kaneko

(10) Patent No.: US 10,618,565 B2
(45) Date of Patent: Apr. 14, 2020

(54) VEHICLE REAR STRUCTURE

(71) Applicant: TOYOTA JIDOSHA KABUSHIKI KAISHA, Toyota-shi, Aichi-ken (JP)

(72) Inventor: Tsuneaki Kaneko, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 90 days.

(21) Appl. No.: 16/104,216

(22) Filed: Aug. 17, 2018

(65) Prior Publication Data
US 2019/0061826 A1 Feb. 28, 2019

(30) Foreign Application Priority Data

Aug. 24, 2017 (JP) .................. 2017-161054

(51) Int. Cl.
B62D 25/04 (2006.01)
B62D 25/16 (2006.01)
B62D 25/06 (2006.01)
B62D 25/08 (2006.01)
B62D 25/02 (2006.01)

(52) U.S. Cl.
CPC ............. B62D 25/04 (2013.01); B62D 25/02 (2013.01); B62D 25/06 (2013.01); B62D 25/087 (2013.01); B62D 25/088 (2013.01); B62D 25/16 (2013.01)

(58) Field of Classification Search
CPC ...... B62D 25/088; B62D 25/04; B62D 25/16; B62D 25/02; B62D 25/087
See application file for complete search history.

(56) References Cited

U.S. PATENT DOCUMENTS

2015/0284033 A1  10/2015 Yamamoto

FOREIGN PATENT DOCUMENTS

| JP | 2000-006843 A | 1/2000 |
| JP | 2008-049723 A | 3/2008 |
| JP | 2013-001123 A | 1/2013 |
| JP | 2014-083955 A | 5/2014 |
| JP | 2015-199376 A | 11/2015 |
| JP | 2016-022793 A | 2/2016 |

Primary Examiner — D Glenn Dayoan
Assistant Examiner — Melissa Ann Bonifazi
(74) Attorney, Agent, or Firm — Oliff PLC

(57) ABSTRACT

A vehicle rear structure is provided which includes a roof side inner panel in which an opening is formed, a wheel house outer panel having a flat plate portion and an outer cover portion, a strainer which is connected to the roof side inner panel and the flat plate portion at a lower side of the opening, a reinforcement member positioned at a lower side of the opening, having an upper end connected to the roof side inner panel, a lower end connected to the outer cover portion, and an intermediate portion connected to the flat plate portion in a manner to oppose the strainer, and a roof side inner frame having a pillar portion which is connected to a roof side inner panel front part forming a C pillar, and a bracket portion which is connected to the flat plate portion and to the reinforcement member.

12 Claims, 11 Drawing Sheets

VEHICLE REAR STRUCTURE

CROSS REFERENCE TO RELATED APPLICATION

The disclosure of Japanese Patent Application No. 2017-161054 filed on Aug. 24, 2017, including the specification, claims, drawings, and abstract, is incorporated herein by reference in its entirety.

TECHNICAL FIELD

The present disclosure relates to a vehicle rear structure of a 6-lights cabin.

BACKGROUND

A structure is proposed in which, in a vehicle rear structure, a roof side outer reinforcement which forms a closed cross section with a roof side inner panel is provided at an outer side, in a width direction of a vehicle body, of the roof side inner panel, and a lower end of the roof side outer reinforcement is connected to an upper end of an outer cover portion of a rear wheel house. With such a structure, vibration of the outer cover portion of the rear wheel house when a force in an up-and-down direction is input from an attachment portion of a rear suspension member can be reduced, and vibration and noise performances of the vehicle body can be improved (for example, refer to JP 2013-1123 A).

Recently, a 6-lights cabin is being used in a sedan or the like, in which a small window is provided at a rear side of a window on a rear door. In the 6-lights cabin, an opening for the window must be provided at a location where the roof side outer reinforcement has been placed in the related art, which may cause insufficient the rigidity of the vehicle body, and consequent reduction of the vibration and noise performances, An advantage of the present disclosure lies in securing the rigidity of a vehicle of the 6-lights cabin type, and improving the vibration and noise performances.

SUMMARY

According to one aspect of the present disclosure, there is provided a vehicle rear structure comprising: a roof side inner panel that forms a side wall of a vehicle rear part and in which an opening in which a quarter window glass can be attached is formed; a wheel house outer panel comprising a flat plate portion which is connected to the roof side inner panel and an outer cover portion that protrudes to an outer side, in a width direction of the vehicle, in relation to the roof side inner panel; a strainer that is connected, at a lower side, in an up-and-down direction of the vehicle, of the opening, to an inner side, in the width direction of the vehicle, of the roof side inner panel and to an inner side, in the width direction of the vehicle, of the flat plate portion of the wheel house outer panel; a reinforcement member at a lower side, in the up-and-down direction of the vehicle, of the opening, having an upper end connected to an outer side, in the width direction of the vehicle, of the roof side inner panel, a lower end connected to the outer cover portion of the wheel house outer panel, and an intermediate portion connected to an outer side, in the width direction of the vehicle, of the flat plate portion of the wheel house outer panel, in a manner to oppose the strainer with the flat plate portion therebetween; and a roof side inner frame comprising a pillar portion which is connected to an outer side, in the width direction of the vehicle, of a roof side inner panel front part which forms a C pillar at a front side, in a front-and-rear direction of the vehicle, of the opening, and a bracket portion which is connected to the flat plate portion of the wheel house outer panel and to an outer side, in the width direction of the vehicle, of the reinforcement member.

As described, because the flat plate portion of the wheel house outer panel is connected to the roof side inner panel, the flat panel portion of the wheel house outer panel, the strainer, and the reinforcement member are connected to form a closed cross-sectional structure, and the flat plate portion of the wheel house outer panel, the reinforcement member, and the bracket portion of the roof side inner frame are connected to form a closed cross-sectional structure, when the vehicle is torsion-deformed, a bending moment applied to the roof side inner panel can be received by the respective closed cross-sectional structures. Thus, a bending deformation near the C pillar of the 6-lights cabin in which the opening for attaching the quarter window glass is formed can be effectively suppressed.

According to another aspect of the present disclosure, in the vehicle rear structure, the strainer, the flat plate portion of the wheel house outer panel, and the intermediate portion of the reinforcement member may be connected at a common bonding point.

By connecting the components at a common bonding point, it becomes possible to form the plurality of closed cross-sectional structures, with a small number of manufacturing steps.

According to another aspect of the present disclosure, in the vehicle rear structure, the strainer may comprise a first plate which is connected to a front side plate, in the front-and-rear direction of the vehicle, of an upper back having a rectangular tubular shape extending in the width direction of the vehicle, and a second plate which is connected to a rear side plate, in the front-and-rear direction of the vehicle, of the upper back, the reinforcement member may be a longitudinal member having a groove-shaped cross section having two flanges, and the flanges of the reinforcement member may be respectively connected to the first plate and the second plate of the strainer, in a manner to oppose the first plate and the second plate with the flat plate portion of the wheel house outer panel therebetween.

Because the first and second plates of the strainer and the flanges of the reinforcement member respectively oppose each other, a strength of the closed cross-sectional structure can be improved. Further, a load from the upper back connected to the strainer can be effectively transferred to a closed cross-sectional structure formed from the flat plate portion of the wheel house outer panel, the strainer, and the reinforcement member.

According to another aspect of the present disclosure, the vehicle rear structure may further comprise: a suspension tower provided at a rear side, in the front-and-rear direction of the vehicle, in relation to the strainer at a lower side, in the up-and-down direction of the vehicle, of the opening; a suspension tower gusset which is connected to an upper surface of the suspension tower and to an inner side, in the width direction of the vehicle, of the flat plate portion of the wheel house outer panel; and a roof side outer panel having an upper part connected to an outer side, in the width direction of the vehicle, of a roof side inner panel rear part at a rear side, in the front-and-rear direction of the vehicle, of the opening, a lower part connected to the outer cover portion of the wheel house outer panel, and a central part connected to an outer side, in the width direction of the vehicle, of the flat plate portion of the wheel house outer panel, in a manner to oppose the suspension tower gusset.

In this manner, because the flat plate portion of the wheel house outer panel, the suspension tower gusset, and the roof side outer panel are connected to form a closed cross-sectional structure, it becomes possible to receive a load from the suspension tower toward the outer side in the width direction of the vehicle at an upper side in the up-and-down direction of the vehicle, and to suppress deformation of the suspension tower gusset.

According to another aspect of the present disclosure, in the vehicle rear structure, the suspension tower gusset, the flat plate portion of the wheel house outer panel, and the central part of the roof side outer panel may be connected at a common bonding point.

In this manner, by connecting the components at a common bonding point, it becomes possible to form the plurality of the closed cross-sectional structures, with a small number of manufacturing steps.

According to another aspect of the present disclosure, in the vehicle rear structure, the suspension tower gusset may be a longitudinal member having a groove-shaped cross section having two flanges, the central part of the roof side outer panel may have a groove-shaped cross section having two flanges, and the flanges of the suspension tower gusset may be respectively connected to the flanges of the central part of the roof side outer panel with the flat plate portion of the wheel house outer panel therebetween, in a manner to oppose the flanges of the central part of the roof side outer panel.

Because the flanges of the roof side outer panel and the flanges of the suspension tower gusset oppose each other, the strength of the closed cross-sectional structure can be improved, and deformation of the suspension tower gusset can be effectively suppressed.

Advantageous Effects of Invention

With the present disclosure, the rigidity of the vehicle of the 6-lights cabin type can be secured, and the vibration and noise performances can be improved.

BRIEF DESCRIPTION OF DRAWINGS

Embodiment(s) of the present disclosure will be described by reference to the following figures, wherein.

DESCRIPTION OF EMBODIMENTS

Figure 1:
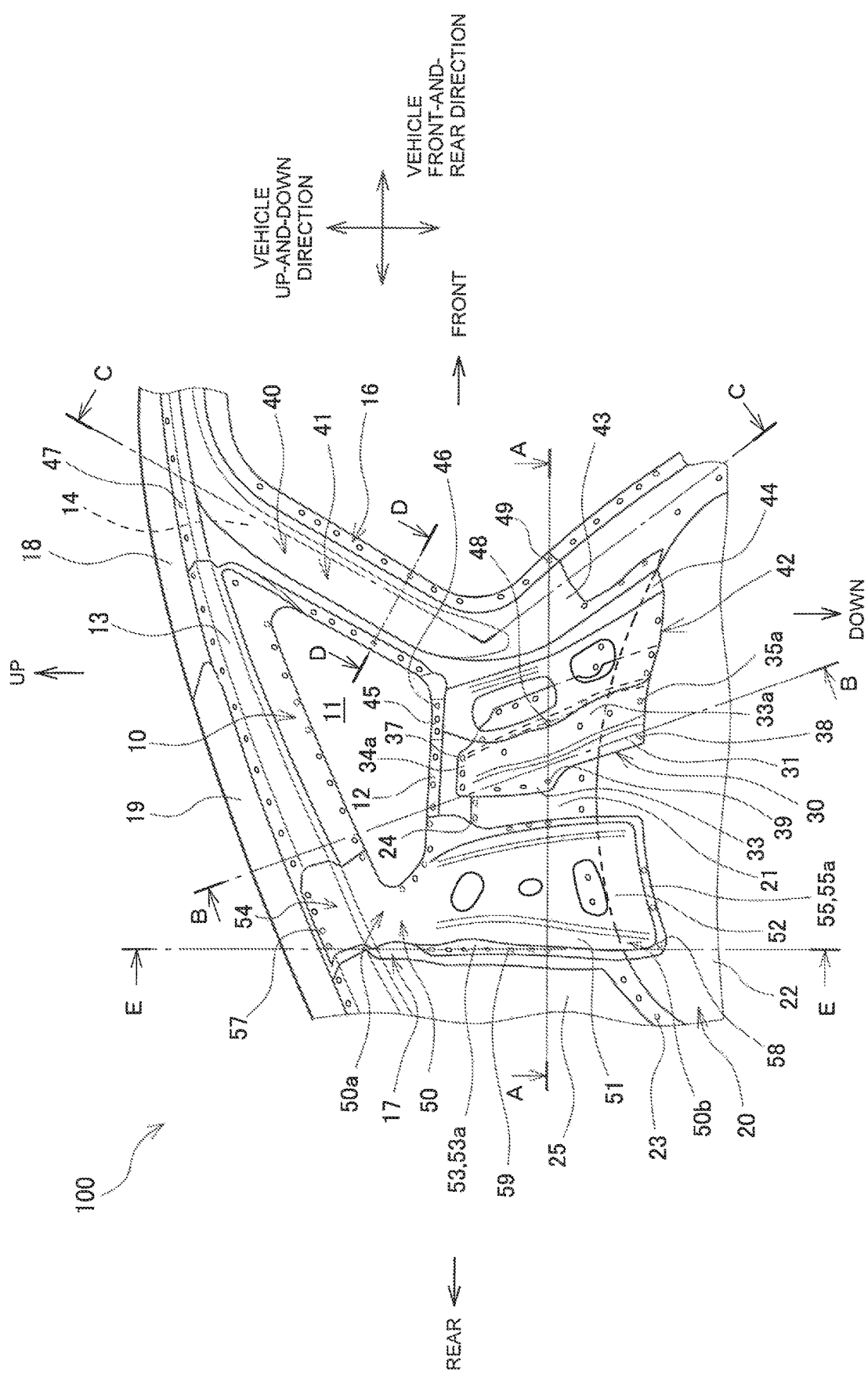
FIG. 1 is an elevation view of a vehicle rear structure according to an embodiment of the present disclosure, as viewed from an outer side in a width direction of a vehicle.
Figure 2:
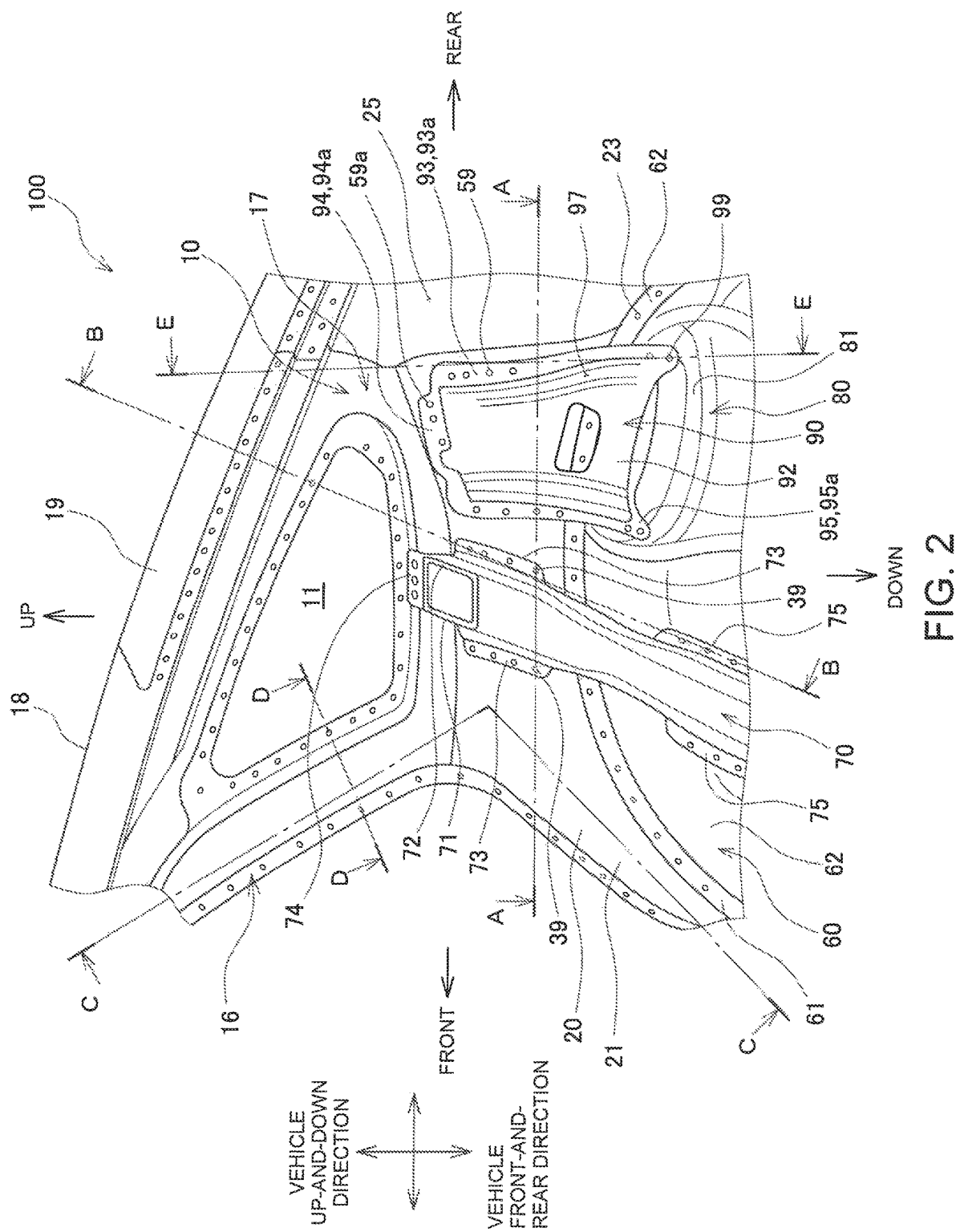
FIG. 2 is an elevation view of the vehicle rear structure according to the embodiment of the present disclosure, as viewed from an inner side in the width direction of the vehicle.

A vehicle rear structure 100 according to an embodiment of the present disclosure will now be described with reference to the drawings. As shown in FIGS. 1 and 2, the vehicle rear structure 100 of the present embodiment comprises a roof side inner panel 10, a reinforcement member 30 attached to an outer side, in a width direction of the vehicle, of the roof side inner panel 10, a roof side inner frame 40, a roof side outer panel 50, a strainer 70 attached to an inner side, in the width direction of the vehicle, of the roof side inner panel 10, a suspension tower gusset 90, a wheel house outer panel 20 connected to a lower side, in an up-and-down direction of the vehicle, of the roof side inner panel 10, a wheel house inner panel 60 connected to an inner side, in the width direction of the vehicle, of the wheel house outer panel 20, and a suspension tower 80.

As shown in FIGS. 1 and 2, the roof side inner panel 10 is a panel forming a side wall of the vehicle rear portion, and an opening 11 is formed therein, in which a quarter window glass can be attached. A front side, in a front-and-rear direction of the vehicle, of the opening 11 is a roof side inner panel front part 14 which forms a C pillar 16, and a rear side, in the front-and-rear direction of the vehicle, of the opening 11 is a roof side inner panel rear part 17. An upper side of the opening 11 is a rear pillar 13 of a closed cross section. The roof side inner panel 10 is formed by connecting a plurality of bend-molded thin plate members by a joining means such as spot welding.

Figure 5:
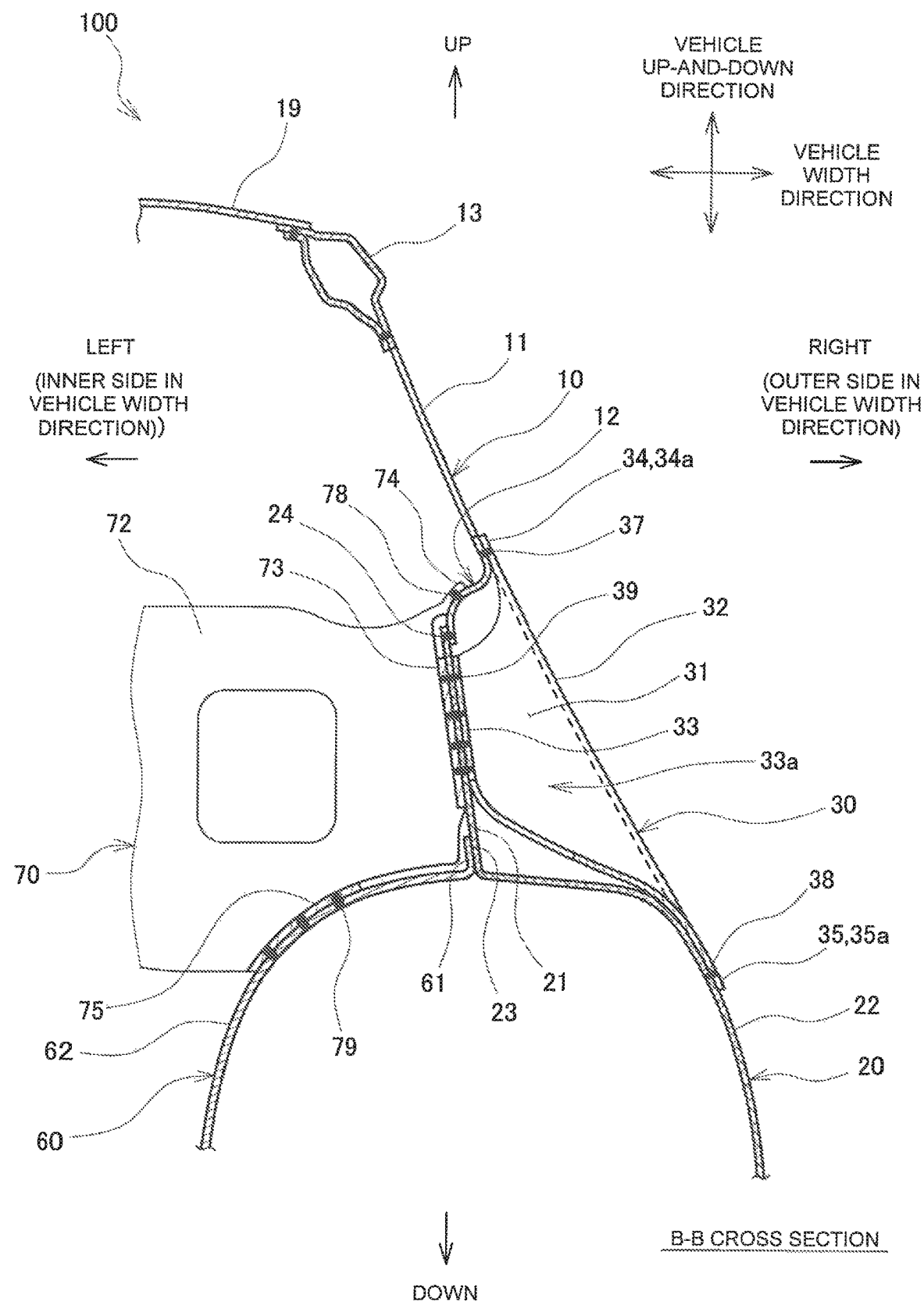
FIG. 5 is a cross sectional view showing line B-B shown in FIGS. 1 and 2, as viewed from rear of the vehicle.

As shown in FIGS. 1, 2, and 5, the wheel house outer panel 20 comprises a flat plate portion 21 having an upper end connected to a lower end of the roof side inner panel 10 at a spot welding point 24 which is a bonding point, and an outer cover portion 22 which protrudes to an outer side, in the width direction of the vehicle, in relation to the roof side inner panel 10 at a lower side of the flat plate portion 21, to cover a rear wheel. The wheel house inner panel 60 comprises a flange 61 connected to the flat plate portion 21 of the wheel house outer panel 20 at a spot welding point 23, and an inner cover portion 62 which protrudes toward an inner side in the width direction of the vehicle, opposing the outer cover portion 22.

Figure 3:
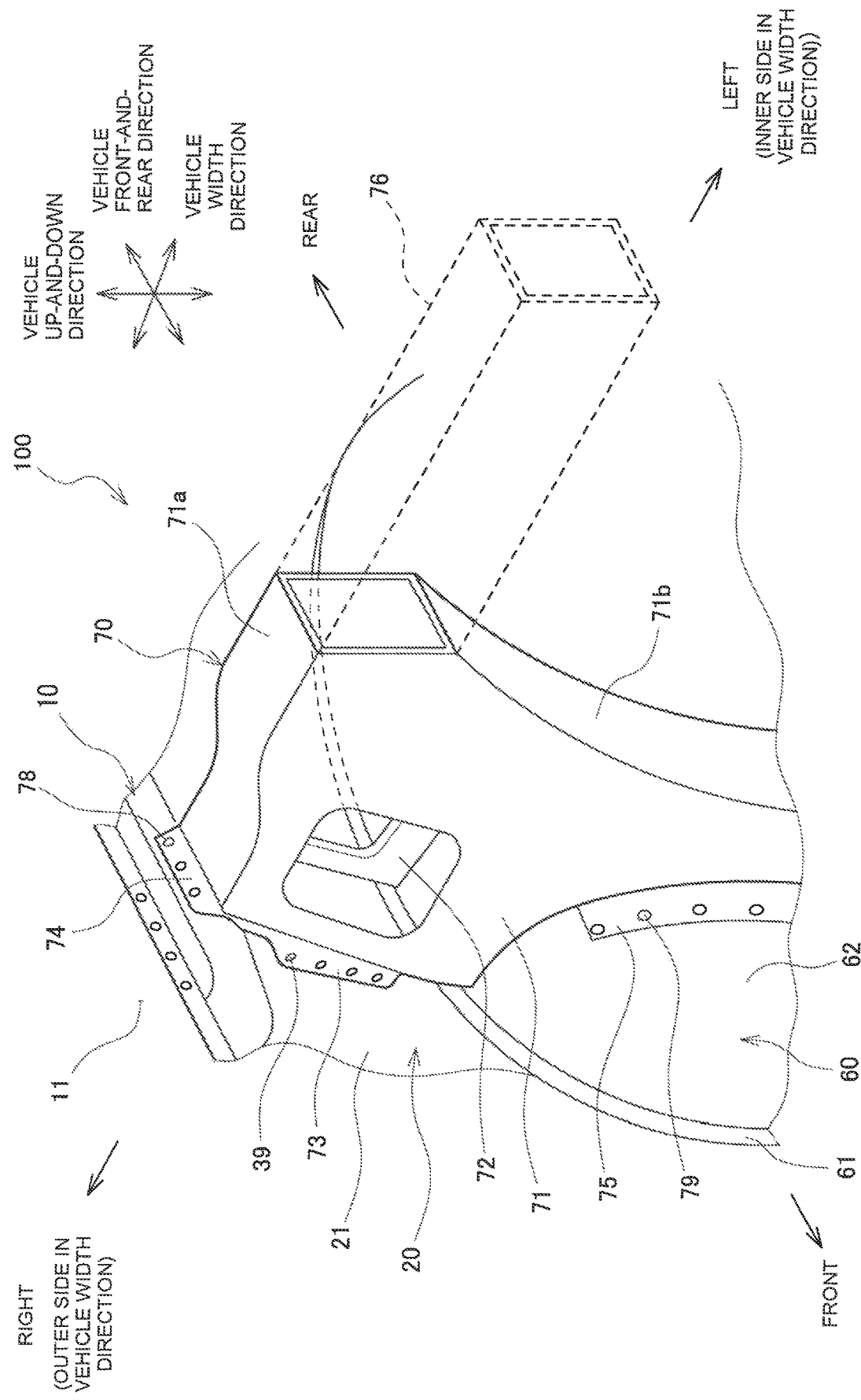
FIG. 3 is a perspective diagram showing a connection state of a roof side inner panel of a strainer, a wheel house outer panel, and a wheel house inner panel of the vehicle rear structure according to the embodiment of the present disclosure.

As shown in FIG. 3, the inner side of the strainer 70 in the width direction of the vehicle is formed by a first plate 71 connected to a front side plate, in the front-and-rear direction of the vehicle, of an upper back 76 having a rectangular tubular shape extending in the width direction of the vehicle, a second plate 72 connected to a rear side plate, in the front-and-rear direction of the vehicle, of the upper back 76, and an upper plate 71a and a lower plate 71b connected respectively to an upper plate and a lower plate of the upper back 76. At a position of the upper plate 71a opposing the roof side inner panel 10, a plate-shaped upper attachment fin 74 is provided. At positions of the first and second plates 71 and 72 opposing the flat plate portion 21 of the wheel house outer panel 20, a plate-shaped middle attachment fin 73 is provided. At a positon of the wheel house inner panel 60 opposing the inner cover portion 62, a plate-shaped lower attachment fin 75 is provided.

Figure 4:
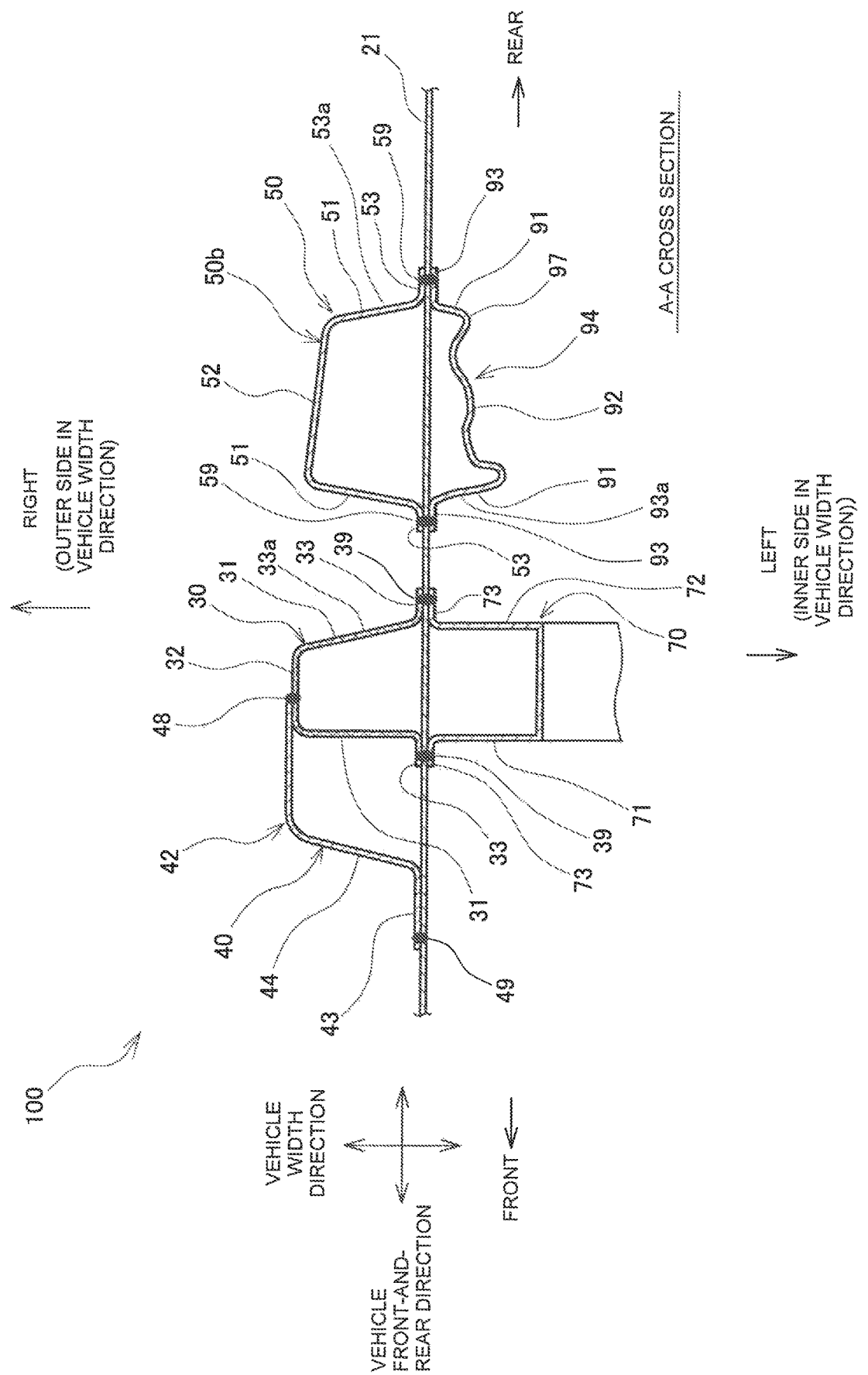
FIG. 4 is a cross sectional view showing line A-A shown in FIGS. 1 and 2, as viewed from an upward direction of the vehicle.

As shown in FIGS. 3 to 5, the upper attachment fin 74 of the strainer 70 is connected to the roof side inner panel 10 at a lower side, in the up-and-down direction of the vehicle, of the opening 11, at a spot welding point 78. Further, the middle attachment fin 73 is connected to a surface, in the inner side, in the width direction of the vehicle, of the flat plate portion 21 of the wheel house outer panel 20, at a spot welding point 39. In addition, the lower attachment fin 75 is connected to the inner cover portion 62 of the wheel house inner panel 60 at a spat welding point 79. A distance from a ridge between the upper attachment fin 74 and the upper plate 71a to the spot welding point 78 is set relatively long, such that the spot welding point 78 is not damaged by concentration of stress at regions near the spot welding point 78. The distance is set to, for example, 13~15 mm.

As shown in FIG. 4, the reinforcement member 30 is a longitudinal member having a groove-shaped cross section, comprising two flanges 31 and a web 32 connecting the flanges 31. As shown in FIGS. 1 and 5, a plate-shaped upper attachment fin 34 is provided at an upper end 34a, a plate-shaped lower attachment fin 35 is provided at a lower end 35a, and a plate-shaped middle attachment fin 33 is provided at an intermediate portion 33a. As shown in FIG. 5, a height of the flange 31 is zero at the upper end 34a and the lower end 35a, and the height of the flange 31 is increased from the upper end 34a toward the intermediate portion 33a, and from the lower end 35a toward the intermediate portion 33a. Therefore, the reinforcement member 30 has a triangular shape as shown in FIG. 5, when the reinforcement member 30 is viewed from the front-and-rear direction of the vehicle.

As shown in FIGS. 1, 4, and 5, the upper attachment fin 34 at the upper end 34a of the reinforcement member 30 is connected to the outer side, in the width direction of the vehicle, of the roof side inner panel 10 at a lower side, in the up-and-down direction of the vehicle, of the opening 11, at a spot welding point 37. Similarly, the lower attachment fin 35 at the lower end 35a is connected to the outer side, in the width direction of the vehicle, of the outer cover portion 22 of the wheel house outer panel 20, at a spot welding point 38. The middle attachment fin 33 of the intermediate portion 33a is connected to a surface at an outer side, in the width direction of the vehicle, of the flat plate portion 21 of the wheel house outer panel 20, at the spot welding point 39. As shown in FIGS. 4 and 5, the reinforcement member 30 is attached to the outer side, in the width direction of the vehicle, of the flat plate portion 21 of the wheel house outer panel 20, in a manner to oppose the strainer 70 in the width direction of the vehicle.

As shown in FIGS. 4 and 5, the middle attachment fin 33 of the reinforcement member 30 and the middle attachment fin 73 of the strainer 70 are connected to the flat plate portion 21 of the wheel house outer panel 20 at the common spot welding point 39. In this manner, the middle attachment fin 33 at the intermediate portion 33a of the reinforcement member 30 is connected to the outer side, in the width direction of the vehicle, of the flat plate portion 21 of the wheel house outer panel 20, in a manner to oppose the middle attachment fin 73 of the strainer 70 with the flat plate portion 21 therebetween. As shown in FIG. 4, the two flanges 31 of the reinforcement member 30 are connected to the first plate 71 and the second plate 72 of the strainer 70 with the flat plate portion 21 of the wheel house outer panel 20 therebetween, in a manner to oppose the first plate 71 and the second plate 72. As shown in FIG. 4, the strainer 70, the intermediate portion 33a of the reinforcement member 30, and the flat plate portion 21 of the wheel house outer panel 20 form a closed cross-sectional structure.

Figure 6:
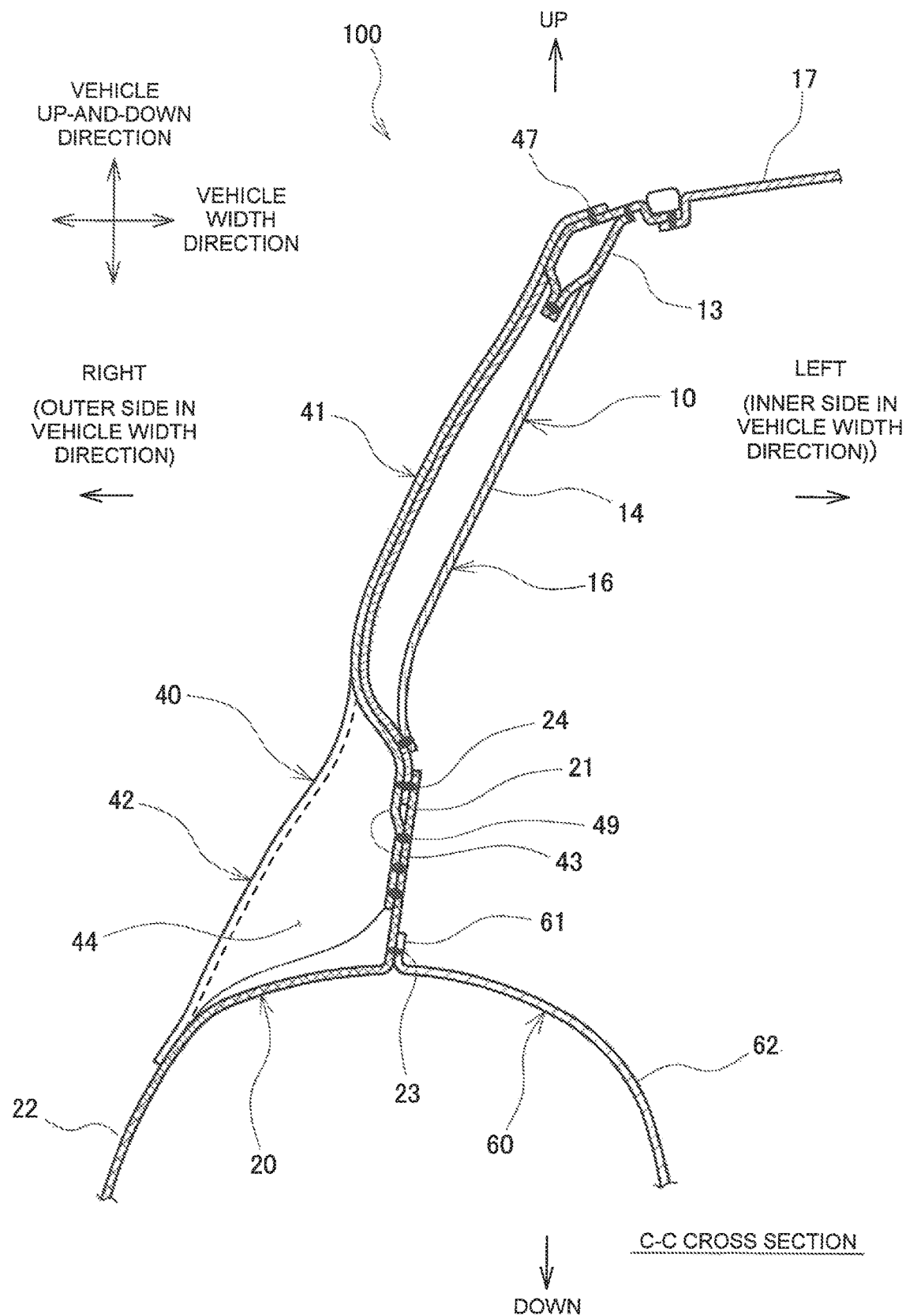
FIG. 6 is a cross sectional view showing line C-C shown in FIGS. 1 and 2, as viewed from front of the vehicle.

As shown in FIGS. 1, 4, and 6, the roof side inner frame 40 comprises a pillar portion 41 connected to an outer side, in the width direction of the vehicle, of the roof side inner panel front part 14 forming the C pillar 16 at a front side, in the front-and-rear direction of the vehicle, of the opening 11, and a bracket portion 42 connected to the flat plate portion 21 of the wheel house outer panel 20 at the outer side, in the width direction of the vehicle, of the reinforcement member 30.

Figure 7:
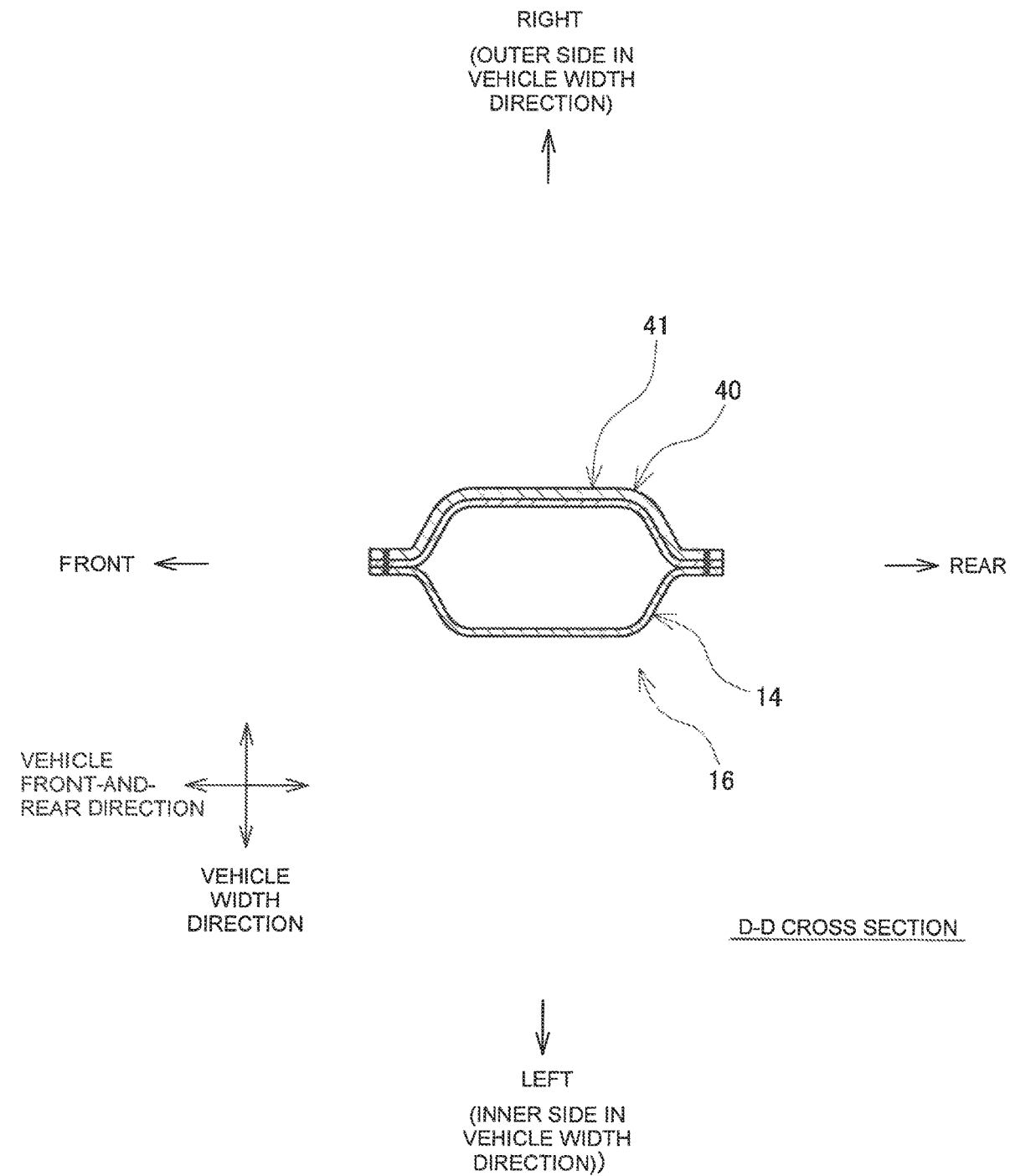
FIG. 7 is a cross sectional view showing line D-D shown in FIGS. 1 and 2, as viewed from the upward direction of the vehicle.

As shown in FIG. 7, the roof side inner panel front part 14 has a closed cross-sectional structure in which members having groove-shaped cross sections are combined, and the pillar portion 41 is a groove-shaped cross-sectional member which covers the member having the groove-shaped cross section of the outer side surface, in the width direction of the vehicle, of the roof side inner panel front part 14. As shown in FIGS. 1 and 6, an upper part of the pillar portion 41 is connected at a spot welding point 47 to a front portion, in the front-and-rear direction of the vehicle, of the rear pillar 13 connected to the roof panel 18, and the lower part of the pillar portion 41 extends to the bracket portion 42 connected to the flat plate portion 21 of the wheel house outer panel 20 at the outer side, in the width direction of the vehicle, of the reinforcement member 30.

As shown in FIGS. 1 and 6, the bracket portion 42 of the roof side inner frame 40 comprises a lower attachment fin 43, a rising portion 44, and an upper attachment fin 45. The lower attachment fin 43 is connected to the fiat plate portion 21 of the wheel house outer panel 20 at a spot welding point 49. The rising portion 44 rises in a hook shape from the lower attachment fin 43 toward the outer side in the width direction of the vehicle, and a tip extending toward the rear side in the front-and-rear direction of the vehicle is connected to the outer side surface, in the width direction of the vehicle, of the web 32 of the reinforcement member 30 at a spot welding point 48. As shown in FIG. 4. the rising portion 44 of the roof side inner frame 40, the flat plate portion 21 of the wheel house outer panel 20, and the flange 31 of the reinforcement member 30 form a closed cross-sectional structure. The upper attachment fin 45 is provided at an upper side of the rising portion 44 in the up-and-down direction of the vehicle, and is connected at a spot welding point 46 to the outer side surface, in the width direction of the vehicle, of the roof side inner panel 10 at a lower portion, in the up-and-down direction of the vehicle, of the opening 11.

Figure 8:
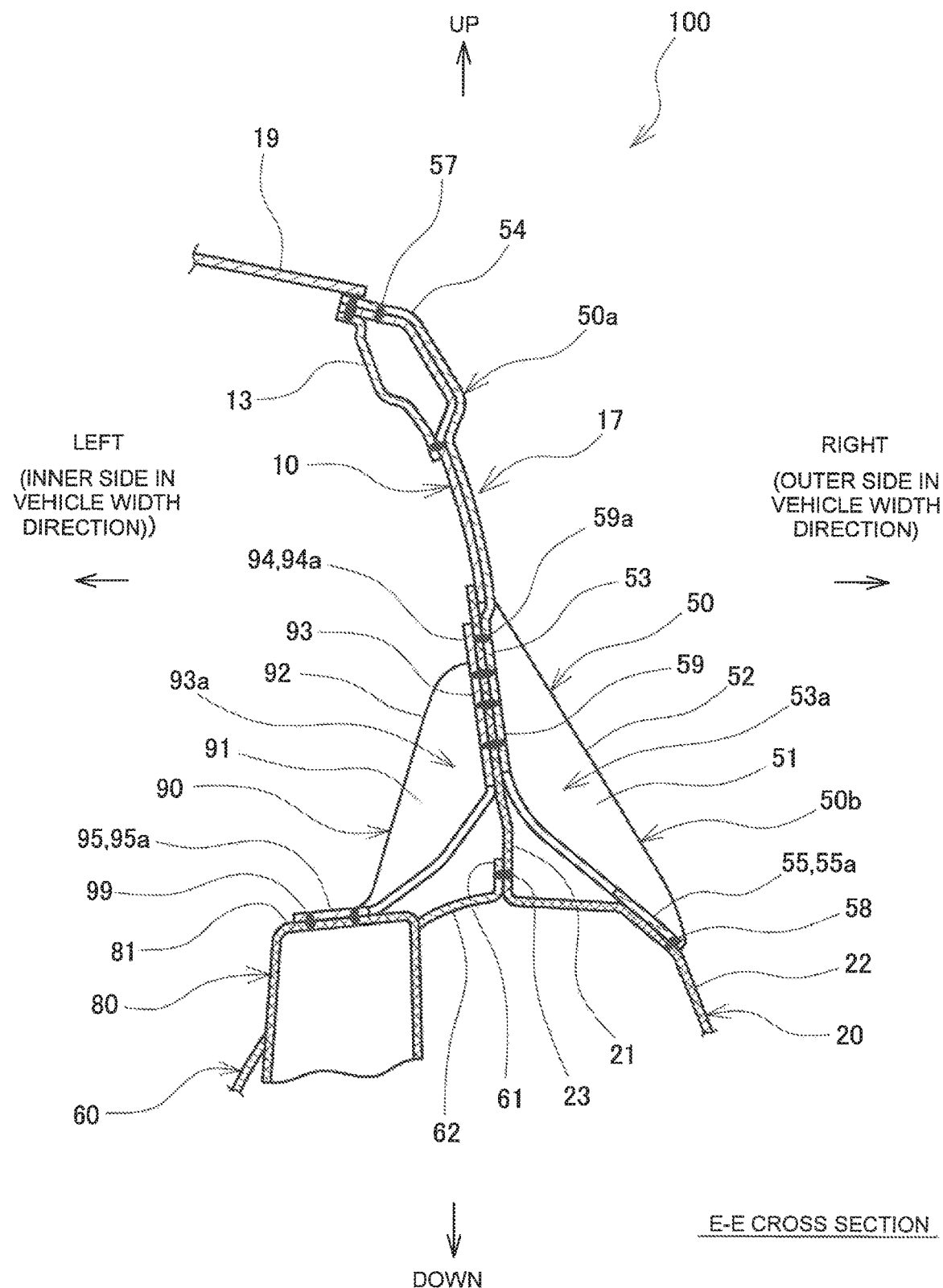
FIG. 8 is a cross sectional view showing line E-E shown in FIGS. 1 and 2, as viewed from the rear of the vehicle.

As shown in FIGS. 2 and 8, the suspension tower 80 which stores a bridging device of a rear wheel is provided at a lower side, in the up-and-down direction of the vehicle, of the opening 11 and at a rear side, in the front-and-rear side of the vehicle, in relation to the strainer 70. The suspension tower 80 is a circular tubular member having an upper surface 81 closed. The circular tubular portion is connected to the inner cover portion 62 of the wheel house inner panel 60, and stores therein the bridging, device comprising a coil spring, a shock absorber, or the like.

On the upper surface 81 of the suspension tower 80, the suspension tower gusset 90 is attached, which connects the upper surface 81 and the inner side, in the width direction of the vehicle, of the lower side, in the up-and-down direction of the vehicle, of the opening 11.

As shown in FIGS. 2, 4, and 8, the suspension tower gusset 90 is a longitudinal member having a groove-shaped cross section, having two flanges 91 and a web 92 connecting the flanges 91. A reinforcement bead 97 which is press-molded in a mountain shape is provided between the flange 91 and the web 92. As shown in FIGS. 2 and 8, a plate-shaped upper attachment fin 94 is provided at an upper end 94a, a plate-shaped lower attachment fin 95 is provided at a lower end 95a, and a plate-shaped middle attachment fin. 93 is provided at an intermediate portion 93a. As shown in FIG. 8, a height of the flange 91 is zero at the upper end 94a and the lower end 95a, and the height of the flange 91 is increased from the upper end 94a toward the intermediate portion 93a and from the lower end 95a toward the intermediate portion 93a. Therefore, the suspension tower gusset 90 has a triangular shape as shown in FIG. 8, when the suspension tower gusset 90 is viewed from the front-and-rear direction of the vehicle.

As shown in FIGS. 2, 4, and 8, the upper attachment fin 94 at the upper end 94a of the suspension tower gusset 90 is connected at a spot welding point 59a to the inner side, in the width direction of the vehicle, of the roof side inner panel 10 at the lower side, in the up-and-down direction of the vehicle, of the opening 11. Similarly, the lower attachment fin 95 at the lower end 95a is connected to the upper surface 81 of the suspension tower 80 at a spot welding point 99. Moreover, the middle attachment fin 93 at the intermediate portion 93a is connected at the spot welding point 59 to the surface at the inner side, in the width direction of the vehicle, of the flat plate portion 21 of the wheel house outer panel 20.

As shown in FIG. 1, the roof side outer panel 50 is provided at an outer side, in the width direction of the vehicle, of the roof side inner panel 10 at a rear side, in the front-and-rear direction of the vehicle, in relation to the reinforcement member 30. As shown in FIGS. 1, 4, and 8, the roof side outer panel 50 comprises an upper half 50a connected to the roof side inner panel 10 to cover the rear pillar 13 and the outer side, in the width direction of the vehicle, of the roof side inner panel rear part 17, and a lower half 50b which is a longitudinal portion having a groove-shaped cross section, extending from the upper half 50a toward the outer cover portion 22 of the wheel house outer panel 20.

As shown in FIGS. 1 and 8, an upper part 54 of the upper half 50a has a plate shape covering the outer side surface, in the width direction of the vehicle, of the rear pillar 13 at the rear side, in the front-and.-rear direction of the vehicle, of the opening 11, and is connected to an upper side surface, in the up-and-down direction of the vehicle, of the rear pillar 13 at a spot welding point 57. As shown in FIG. 4, the lower half 50b extending from the upper half 50a toward the lower side is a longitudinal portion having a groove-shaped cross section, having two flanges 51 and a web 52 connecting the flanges 51, similar to the reinforcement member 30 already described above. As shown in FIGS. 1 and 8, a plate-shaped lower attachment fin 55 is provided at a lower part 55a of the lower half 50b, and a plate-shaped middle attachment fin 53 is provided at a central part 53a. As shown in FIG. 8, a height of the flange 51 is zero at a portion extending to the upper half 50a and at the lower part 55a, and the height of the flange 51 is increased from the portion extending to the upper half 50a toward the central part 53a and from the lower part 55a toward the central part 53a. Therefore, the lower half 50b has a triangular shape as shown in FIG. 8, when the lower half 50b is viewed from the front-and-rear direction of the vehicle.

As shown in FIGS. 1, 4, and 8, the middle attachment fin 53 at the central part 53a of the lower half 50b is connected at the sport welding point 59 to the surface at the outer side, in the width direction of the vehicle, of the flat plate portion 21 of the wheel house outer panel 20. Similarly, the lower attachment fin 55 at the lower part 55a is connected at a sport welding point 58 to the outer side, in the width direction of the vehicle, of the outer cover portion 22 of the wheel house outer panel 20. As shown in FIGS. 4 and 8, the lower half 50b is attached to the outer side, in the width direction of the vehicle, of the flat plate portion 21 of the wheel house outer panel 20, in a manner to oppose the suspension tower gusset 90 in the width direction of the vehicle.

As shown in FIGS. 4 and 8, the middle attachment fin 53 of the lower half 50b of the roof side outer panel 50 and the middle attachment fin 93 of the suspension tower gusset 90 are connected to the flat plate portion 21 of the wheel house outer panel 20 at the common spot welding point 59. In this manner, the middle attachment fin 53 at the central part 53a of the lower half 50b is connected to the outer side, in the width direction of the vehicle, of the flat plate portion 21 of the wheel house outer panel 20, in a manner to oppose the middle attachment fin 93 of the suspension tower gusset 90 with the flat plate portion 21 therebetween. In addition, as shown in FIG. 4, the two flanges 51 of the lower half 50b are connected to the two flanges 91 of the suspension tower gusset 90 with the flat plate 21 of the wheel house outer panel 20 therebetween, in a manner to oppose the two flanges 91 of the suspension tower gusset 90.

In this manner, in the roof side outer panel 50, the upper part 54 of the upper half 50a is connected to the outer side, in the width direction of the vehicle, of the roof side inner panel rear part 17 at the rear side, in the front-and-rear direction of the vehicle, of the opening 11, the lower part 55a of the lower half 50b is connected to the outer cover portion 22 of the wheel house outer panel 20, and the central part 53a is connected to the outer side, in the width direction of the vehicle, of the fiat plate portion 21 of the wheel house outer panel 20, in a manner to oppose the suspension tower gusset 90. As shown in FIG. 4, the central part 53a of the lower half 50b of the roof side outer panel 50, the intermediate portion 93a of the suspension tower gusset 90, and the flat plate portion 21 of the wheel house outer panel 20 form a closed cross-sectional structure.

Next, with reference to FIGS. 9 to 11, transfer of load and deformation will be described when a load is applied to a vehicle 200 having the vehicle rear structure 100 formed in a manner described above, from a road surface in a manner to twist the vehicle 200.

Figure 9:
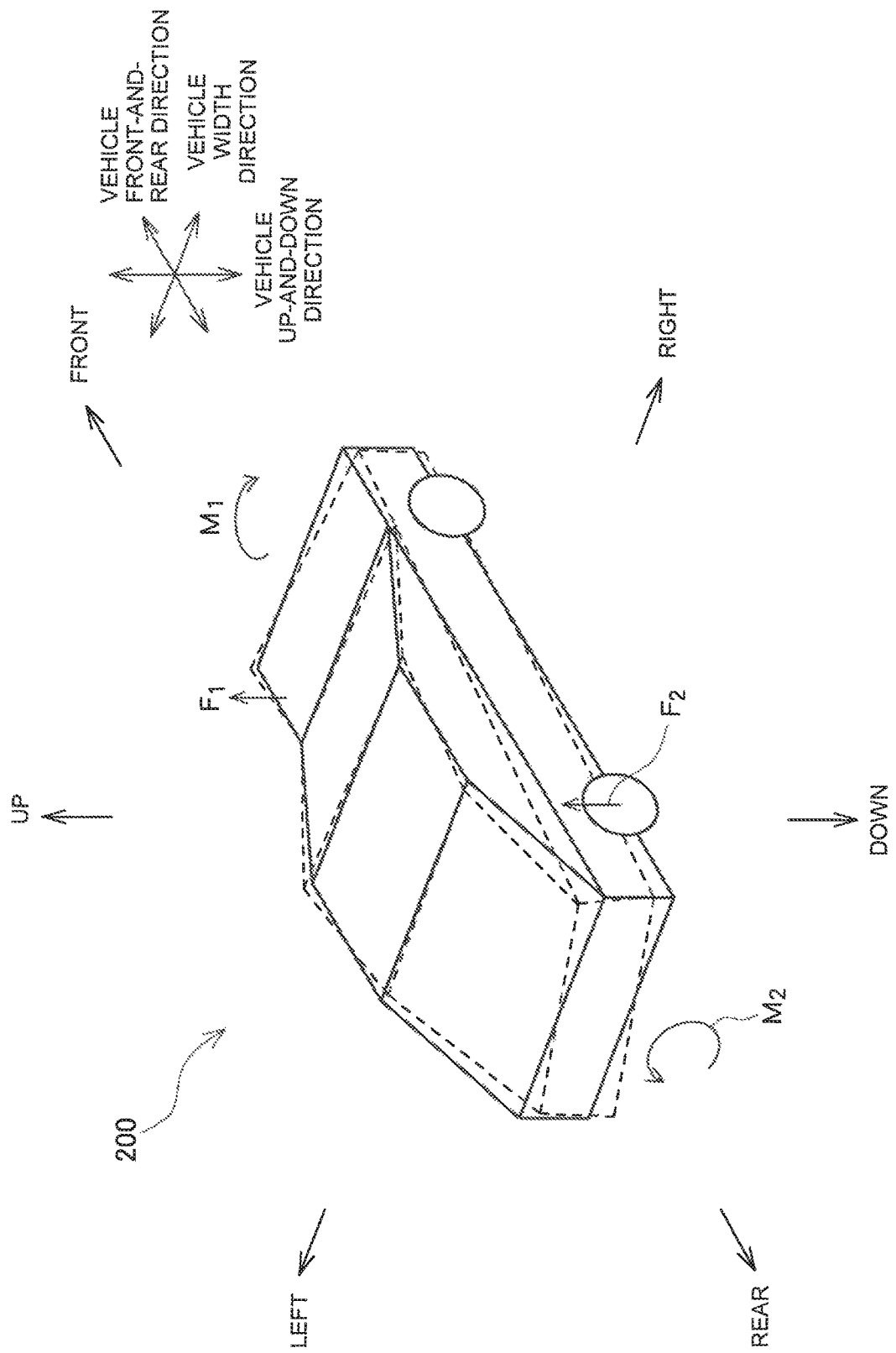
FIG. 9 is a perspective diagram showing a torsional deformation of a vehicle.

As shown in FIG. 9, when an upward load F1 to elevate the vehicle 200 upward is input from a left front wheel and, at the same time, an upward load F2 to elevate the vehicle 200 upward is input from a right rear wheel, a rotational moment M1 in a clockwise direction is applied to the front side of the vehicle 200, and a rotational moment M2 in a counterclockwise direction is applied to the rear side of the vehicle 200. Due to the rotational moments M1 and M2, a torsional force is applied to the vehicle 200 along the front-and-rear direction of the vehicle.

Figure 10:
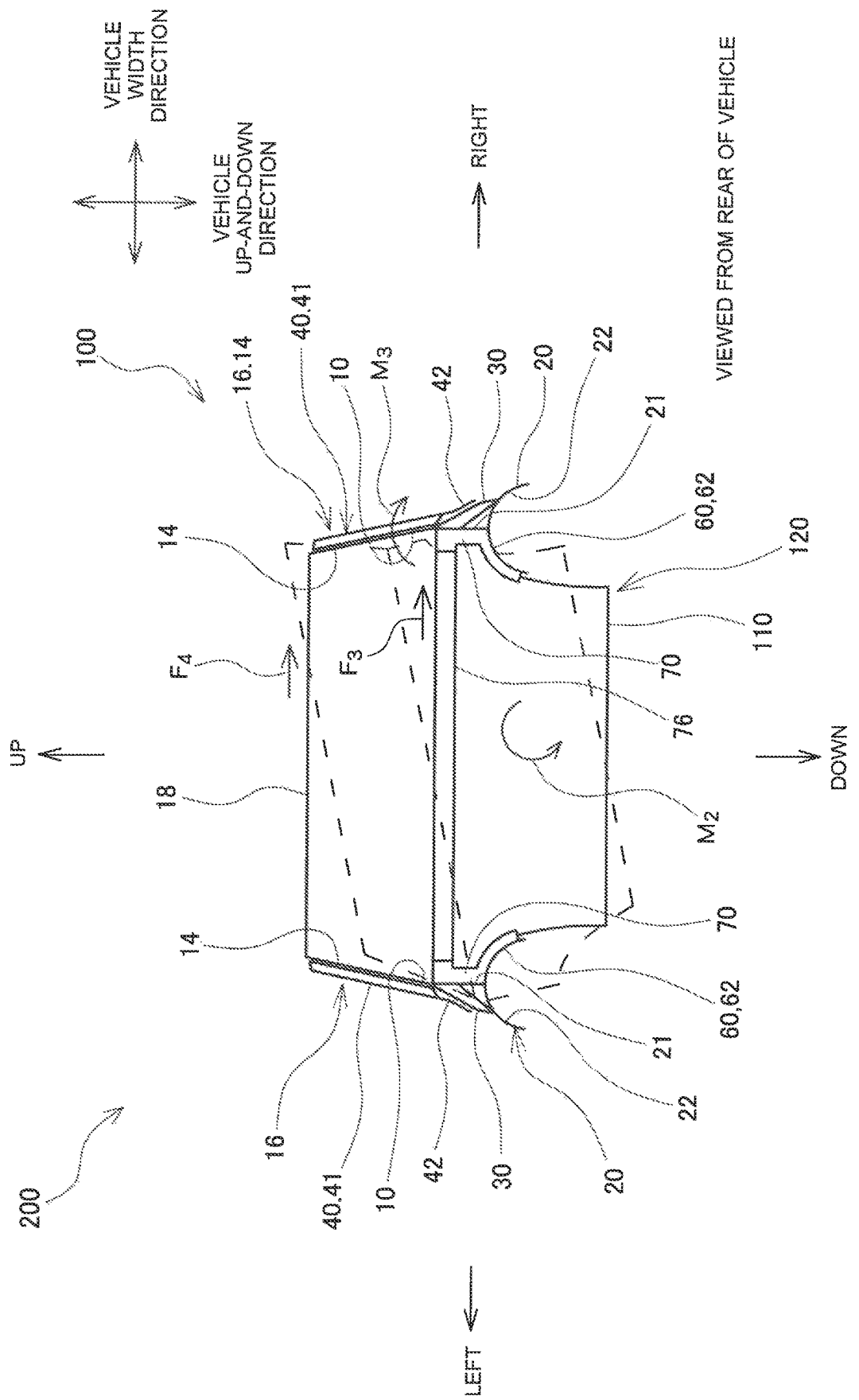
FIG. 10 is a schematic diagram of transfer of a force applied to the vehicle rear structure and deformation e when a torsional moment is applied to the vehicle, as viewed from a rear side of the vehicle.

As shown in FIG. 10, at the inner side, of the vehicle, of the strainer 70 at the rear side of the vehicle 200, the upper back 76 of a strength member extending in the width direction of the vehicle is connected, and a lower cross member 110 which is a strength member extending in the width direction of the vehicle at the lower side, in the up-and-down direction of the vehicle, of the strainer 70 is connected at the lower part of the strainer 70. The strainer 70, the upper back 76, and the lower cross member 110 form a rectangular strength frame 120 at the rear part of the vehicle. As described with reference to FIGS. 1 to 6, the reinforcement member 30 is attached opposing the strainer 70 at the outer side, in the width direction of the vehicle, of the strainer 70, the pillar portion 41 of the roof side inner frame 40 is attached in a covering manner to the outer side, in the width direction of the vehicle, of the roof side inner panel front part 14 having the closed cross-sectional structure, and the bracket portion 42 of the roof side inner frame 40 is connected to the reinforcement member 30.

When the rotational moment M2 in the counterclockwise direction is input to the rear part of the vehicle, the rectangular strength frame 120 formed from the strainer 70, the upper back 76, and the lower cross member 110 is rotationally deformed about an axis extending in the front-and-rear direction of the vehicle, while maintaining its rectangular shape. As a reaction force, a force F3 toward a right direction of the vehicle is input from the strainer 70 to the roof side inner panel 10 and the flat plate portion 21 of the wheel house outer panel 20. In addition, due to the rotational moment M1 in the clockwise direction applied to the front part of the vehicle, a force F4 toward the right direction of the vehicle is input to the roof panel 18.

Deformation in a 6-lights cabin vehicle which does not have the reinforcement member 30 or the like as in the vehicle rear structure 100 described above with reference to FIGS. 1 to 8 is shown by a broken line in FIG. 10. As shown by the broken line in FIG. 10, in the 6-lights cabin vehicle which does not have the reinforcement member 30 or the like, the roof side inner panel 10 and the flat plate portion 21 of the wheel house outer panel 20 to which the strainer 70 is connected are deformed to the right side of the vehicle by the force F3. The rectangular strength frame 120 is rotationally deformed in the counterclockwise direction while deforming into a parallelogram shape. The roof panel 18 attempts to deform in the clockwise direction; that is, the right side of the vehicle the force F4. With this deformation, a bending moment M3 in the clockwise direction is applied to the C pillar 16. In the 6-lights cabin vehicle which does not have the reinforcement member 30 or the like, the strength near the opening 11 is not sufficient because the opening 11 is provided, and, as a consequence, the C pillar 16 is bend-deformed by the bending moment M3.

On the contrary, in the vehicle 200 having the vehicle rear structure 100 having the reinforcement member 30 or the like, as shown in FIG. 10, the force F3 toward the right direction of the vehicle, which is input from the strainer 70, is received by the reinforcement member 30. In the reinforcement member 30, the intermediate portion 33a forms the closed cross-sectional structure along with the strainer 70, and the lower end 35a is connected to the outer cover portion 22 of the wheel house outer panel 20. Because of this, it becomes possible to suppress deformation of the roof side inner panel 10 and the flat plate portion 21 of the wheel house outer panel 20 by the force F3 in the right direction of the vehicle. In addition, the flat plate portion 21 of the wheel house outer panel 20, the strainer 70, and the reinforcement member 30 are connected in a manner to form the closed cross-sectional structure, and the flat plate portion 21 of the wheel house outer panel 20, the reinforcement member 30, and the bracket portion 42 of the roof side inner frame 40 are connected in a manner to form the closed cross-sectional structure. Because of these structures, it is possible to receive the bending moment M3 applied to the roof side inner panel 10 by the closed cross-sectional structures. In addition, because the roof side inner panel front part 14 is reinforced by the pillar portion 41, extending from the bracket portion 42 of the roof side inner frame 40, when the vehicle is torsion-deformed, deformation of the C pillar 16 due to the bending moment M3 can be suppressed.

Furthermore, the first and second plates 71 and 72 of the strainer 70 and the flanges 31 of the reinforcement member 30 form the closed cross-sectional structure in an opposing manner. Because of this, a force can be smoothly transferred from the strainer 70 to the reinforcement member 30, and no additional deformation is caused. Further, the middle attachment fin 73 of the strainer 70 and the middle attachment fin 33 of the reinforcement member 30 are connected at the common spot welding point 39 in a manner to oppose the flat plate portion 21 of the wheel house outer panel 20. Because of this, a structure having a sufficient strength can be realized, with a small number of manufacturing steps.

Figure 11:
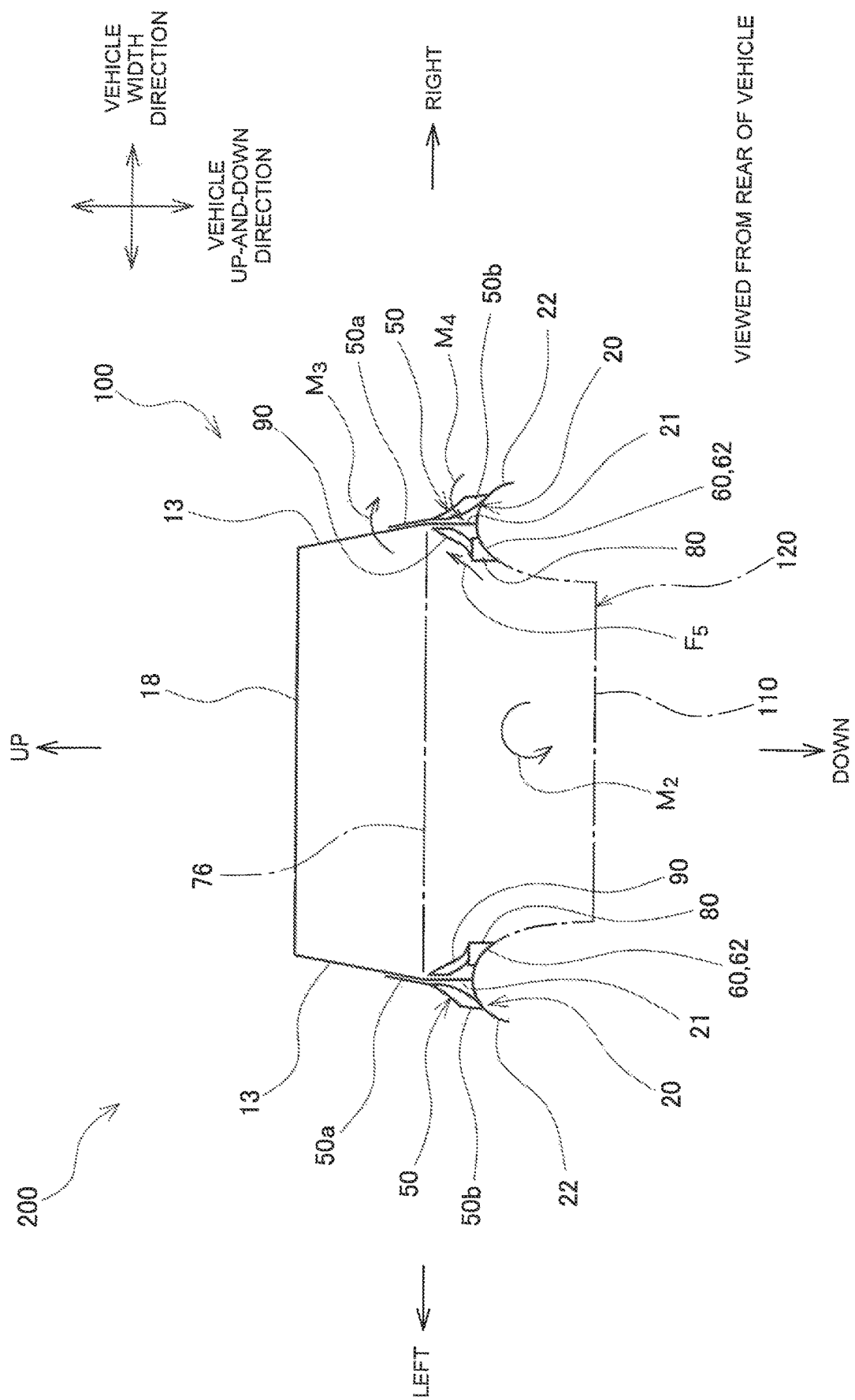
FIG. 11 is a schematic diagram showing transfer of a force applied to the vehicle rear structure when a torsional moment and a bound load are applied to the vehicle, as viewed from the rear side of the vehicle.

In addition, as shown in FIG. 11, the suspension tower gusset 90 and the roof side outer panel 50 are placed further rearward, in the front-and-rear direction of the vehicle, than the strainer 70 and the reinforcement member 30. With this structure, a force F5 in a slanted upward direction of the vehicle which is input to the roof side inner panel 10 and the flat plate portion 21 of the wheel house outer panel 20 via the suspension tower gusset 90 can be received by the lower half 50b of the roof side outer panel 50 which forms the closed cross section With the intermediate portion 93a of the suspension tower gusset 90. With this structure, it becomes possible to suppress deformation of the suspension tower gusset 90 and deformation of the roof side inner panel 10 and the flat plate portion 21 of the wheel house outer panel 20 to the right side of the vehicle.

Moreover, because the flanges 91 of the suspension tower gusset 90 and the flanges 51 of the lower half 50b of the roof side outer panel 50 form the closed, cross sections in an opposing manner, a three can be smoothly transferred from the suspension tower gusset 90 to the lower half 50b of the roof side outer panel 50, and no additional deformation is caused. In addition, the middle attachment fin 93 of the suspension tower gusset 90 and the middle attachment fin 53 of the lower half 50b of the roof side outer panel 58 are connected at the common spot welding point 59 in a manner to oppose the flat plate portion 21 of the wheel house outer panel 20. Because of this, a structure with a sufficient strength can be realized with a small number of manufacturing steps.

As described, the vehicle rear structure 100 can secure rigidity of the 6-lights cabin vehicle 200, and can improve vibration and noise performances.

The invention claimed is:

1. A vehicle rear structure comprising:
   a roof side inner panel that forms a side wall of a vehicle rear part and in which an opening in which a quarter window glass can be attached is formed;
   a wheel house outer panel comprising a flat plate portion which is connected to the roof side inner panel and an outer cover portion that protrudes to an outer side, in a width direction of the vehicle, in relation to the roof side inner panel;
   a strainer that is connected, at a lower side, in an up-and-down direction of the vehicle, of the opening, to an inner side, in the width direction of the vehicle, of the roof side inner panel and to an inner side, in the width direction of the vehicle, of the flat plate portion of the wheel house outer panel;

a reinforcement member at a lower side, in the up-and-down direction of the vehicle, of the opening, having an upper end connected to an outer side, in the width direction of the vehicle, of the roof side inner panel, a lower end connected to the outer cover portion of the wheel house outer panel, and an intermediate portion connected to an outer side, in the width direction of the vehicle, of the flat plate portion of the wheel house outer panel, in a manner to oppose the strainer with the flat plate portion therebetween; and a roof side inner frame comprising a pillar portion which is connected to an outer side, in the width direction of the vehicle, of a roof side inner panel front part which forms a C pillar at a front side, in a front-and-rear direction of the vehicle, of the opening, and a bracket portion which is connected to the flat plate portion of the wheel house outer panel and to an outer side, in the width direction of the vehicle, of the reinforcement member.

2. The vehicle rear structure according to claim 1, wherein the strainer, the flat plate portion of the wheel house outer panel, and the intermediate portion of the reinforcement member are connected at a common bonding point.

3. The vehicle rear structure according to claim 2, wherein the strainer comprises a first plate which is connected to a front side plate, in the front-and-rear direction of the vehicle, of an upper back having a rectangular tubular shape extending in the width direction of the vehicle, and a second plate which is connected to a rear side plate, in the front-and-rear direction of the vehicle, of the upper back, the reinforcement member is a longitudinal member having a groove-shaped cross section having two flanges, and the flanges of the reinforcement member are respectively connected to the first plate and the second plate of the strainer, in a manner to oppose the first plate and the second plate with the flat plate portion of the wheel house outer panel therebetween.

4. The vehicle rear structure according to claim 1, further comprising:

a suspension tower provided at a rear side, in the front-and-rear direction of the vehicle, than the strainer at a lower side, in the up-and-down direction of the vehicle, of the opening;

a suspension tower gusset which is connected to an upper surface of the suspension tower and to an inner side, in the width direction of the vehicle, of the flat plate portion of the wheel house outer panel; and a roof side outer panel having an upper part connected to an outer side, in the width direction of the vehicle, of a roof side inner panel rear part at a rear side, in the front-and-rear direction of the vehicle, of the opening, a lower part connected to the outer cover portion of the wheel house outer panel, and a central part connected to an outer side, in the width direction of the vehicle, of the flat plate portion of the wheel house outer panel, in a manner to oppose the suspension tower gusset.

5. The vehicle rear structure according to claim 2, further comprising:

a suspension tower provided at a rear side, in the front-and-rear direction of the vehicle, in relation to the strainer at a lower side, in the up-and-down direction of the vehicle, of the opening;

a suspension tower gusset which is connected to an upper surface of the suspension tower and to an inner side, in the width direction of the vehicle, of the flat plate portion of the wheel house outer panel; and a roof side outer panel having an upper part connected to an outer side, in the width direction of the vehicle, of a roof side inner panel rear part at a rear side, in the front-and-rear direction of the vehicle, of the opening, a lower part connected to the outer cover portion of the wheel house outer panel, and a central part connected to an outer side, in the width direction of the vehicle, of the flat plate portion of the wheel house outer panel, in a manner to oppose the suspension tower gusset.

6. The vehicle rear structure according to claim 3, further comprising:

a suspension tower provided at a rear side, in the front-and-rear direction of the vehicle, in relation to the strainer at a lower side, in the up-and-down direction of the vehicle, of the opening;

a suspension tower gusset which is connected to an upper surface of the suspension tower and to an inner side, in the width direction of the vehicle, of the flat plate portion of the wheel house outer panel; and a roof side outer panel having an upper part connected to an outer side, in the width direction of the vehicle, of a roof side inner panel rear part at a rear side, in the front-and-rear direction of the vehicle, of the opening, a lower part connected to the outer cover portion of the wheel house outer panel, and a central part connected to an outer side, in the width direction of the vehicle, of the flat plate portion of the wheel house outer panel, in a manner to oppose the suspension tower gusset.

7. The vehicle rear structure according to claim 4, wherein the suspension tower gusset, the flat plate portion of the wheel house outer panel, and the central part of the roof side outer panel are connected at a common bonding point.

8. The vehicle rear structure according to claim 5, wherein the suspension tower gusset, the flat plate portion of the Wheel house outer panel, and the central part of the roof side outer panel are connected at a common bonding point.

9. The vehicle rear structure according to claim 6, wherein the suspension tower gusset, the flat plate portion of the wheel house outer panel, and the central part of the roof side outer panel are connected at a common bonding point.

10. The vehicle rear structure according to claim 7, wherein the suspension tower gusset is a longitudinal member having a groove-shaped cross section having two flanges, the central part of the roof side outer panel has a groove-shaped cross section having two flanges, and the flanges of the suspension tower gusset are respectively connected to the flanges of the central part of the roof side outer panel with the flat plate portion of the wheel house outer panel therebetween, in a manner to oppose the flanges of the central part of the roof side outer panel.

11. The vehicle rear structure according to claim 8, wherein the suspension tower gusset is a longitudinal member having a groove-shaped cross section having two flanges, the central part of the roof side outer panel has a groove-shaped cross section having two flanges, and the flanges of the suspension tower gusset are respectively connected to the flanges of the central part of the roof side outer panel with the flat plate portion of the wheel house outer panel therebetween, in a manner to oppose the flanges of the central part of the roof side outer panel.

12. The vehicle rear structure according to claim 9, wherein
the suspension tower gusset is a longitudinal member having a groove-shaped cross section having two flanges,
the central part of the roof side outer panel has a groove-shaped cross section having two flanges, and
the flanges of the suspension tower gusset are respectively connected to the flanges of the central part of the roof side outer panel with the flat plate portion of the wheel house outer panel therebetween, in a manner to oppose the flanges of the central part of the roof side outer panel.

\* \* \* \* \*